United States Patent [19]

Conrad

[11] 4,152,625
[45] May 1, 1979

[54] PLASMA GENERATION AND CONFINEMENT WITH CONTINUOUS WAVE LASERS

[75] Inventor: Raymond W. Conrad, Russellville, Ala.

[73] Assignee: The United States of America as represented by the Secretary of the Army, Washington, D.C.

[21] Appl. No.: 903,638

[22] Filed: May 8, 1978

[51] Int. Cl.² .............................................. H05H 1/10
[52] U.S. Cl. ............................ 315/111.7; 313/231.4; 313/161; 315/150
[58] Field of Search ................. 313/231.3, 231.4, 161; 315/111.4, 111.7, 150

[56] References Cited

U.S. PATENT DOCUMENTS

| 3,265,583 | 8/1966 | Baker et al. .................. 315/111.7 X |
| 3,935,504 | 1/1976 | Guillaneux et al. ........... 313/231.3 X |

*Primary Examiner*—Palmer C. Demeo
*Attorney, Agent, or Firm*—Nathan Edelberg; Robert P. Gibson; Freddie M. Bush

[57] ABSTRACT

A method and apparatus for initiating a stable plasma and maintaining the plasma stationary. A high power, continuous wave laser is used to initiate and maintain the plasma, while a magnetic trap confines the plasma.

6 Claims, 1 Drawing Figure

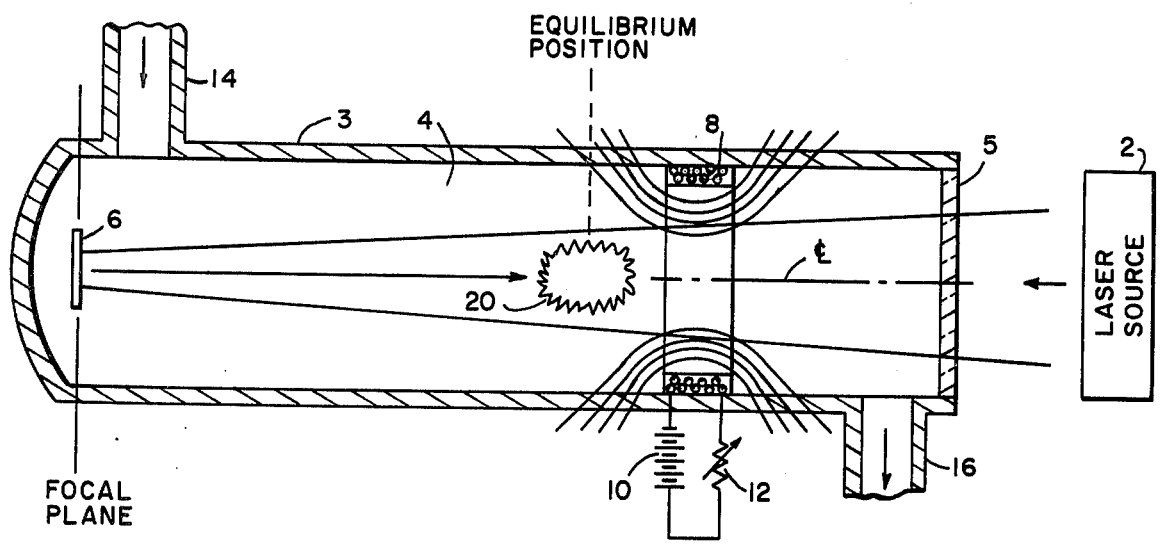

000
PLASMA GENERATION AND CONFINEMENT WITH CONTINUOUS WAVE LASERS

DEDICATORY CLAUSE

The invention described herein may be manufactured, used, and licensed by or for the Government for governmental purposes without the payment to me of any royalties thereon.

BACKGROUND OF THE INVENTION

High temperature and density plasmas are used in a variety of applications, such as in plasma torches for flame-spraying refractory materials, in sources of continium radiation and as a medium for carrying out chemical reactions. Techniques presently employed to produce continuous plasmas include the use of very high current electric arcs, high power radio-frequency (rf) or microwave discharges and very highly focused, high power continuous wave lasers. Short pulse length plasmas are commonly produced by high power pulsed lasers. A disadvantage of the electric arc and the high frequency discharge is that of having a solid material in close proximity to the plasma. This material is subjected to intense radiant and convective heating, and may erode or otherwise degrade at a rapid rate, leading to chemical contamination of the plasma. A disadvantage of the rf generated plasma is the presence of large, stray fields of rf energy. All of these techniques result in limited plasma temperature.

After ignition, a plasma tends to propagate away from the higher intensity regions of the focused laser beam, and stabilize at a location where the radiation intensity is the minimum required for plasma maintenance. A consequence of the plasma migration to a relatively low intensity region is a very much reduced plasma temperature. Additionally, the absorption of the laser radiation by the plasma is also reduced, leading to an inefficient utilization of laser energy.

Stable, mobile atmospheric air plasmas may be produced with an intense, continuous wave, $CO_2$ laser beam. These plasmas can be initiated by interaction of the laser beam with a metallic target. The function of the target, insofar as is presently known, is to produce a sufficient free electron concentration to provide a localized region, external to the target, with a significant absorption coefficient for the laser radiation. After initiation, sufficient energy is transferred to the surrounding air, to produce ionization. The air plasma then travels up the laser beam with a velocity proportional to $I/I_t - 1$ where I is the incident laser intensity and $I_t$ is the threshold intensity for maintaining a plasma at zero velocity.

SUMMARY OF THE INVENTION

Radiation from a high power, infrared laser is directed to a target to initiate a plasma or laser-supported combustion wave, with the assistance of a plasma initiation device. A plasma is ignited using the plasma initiation device, and is allowed to propagate up the laser beam until it encounters and is stopped in the center of the beam by a magnetic field. The position of the plasma along the beam axis and the plasma temperature are controlled by the intensity of the laser beam and the strength of the magnetic field which may force the plasma to retreat into higher intensity regions of the converging beam, where it absorbs more energy from the beam, and hence reaches higher temperatures. By the use of different gases, vapors and/or finely-divided particulates, the physical and chemical characteristics of the plasma may be changed, as desired. For example, the gas employed may be in air or may be any from the group of atomic, molecular, or vapor gases such as xenon, argon, hydrogen or mercury vapor. Particulates which may be added, typically, include those used with an RF generated plasma such as finely-divided aluminum oxide as employed in prior art flame spraying. Thus a stable plasma is initiated in any suitable gas and can be maintained stationary or selectably positioned along an axis while the power input to the plasma is increased.

BRIEF DESCRIPTION OF THE DRAWING

The single FIGURE is a diagrammatic view of a preferred embodiment of apparatus for the generation and confinement of plasma.

DESCRIPTION OF THE PREFERRED EMBODIMENT

Referring now to the single FIGURE drawing, a high power, continuous wave, $CO_2$ laser 2 directs a laser beam into a chamber 4 of housing 3 which contains the appropriate gas. A metal target 6 or other suitable arrangement for plasma ignition, such as electrodes for providing an electrical discharge, is disposed at the focal plane of the laser beam. An electronmagnetic coil 8, preferably superconducting, functions as a magnetic mirror and is disposed around a portion of the interior circumference of the chamber for directing a magnetic field uniformly around the chamber longitudinal axis and laser beam axis encompassed by said coil. A power supply 10 and rheostat 12 control the field developed by the coil. A gas inlet port 14 and outlet port 16 may be appropriately coupled as is well established in the art to establish a desired pressure or vacuum of operation within the chamber.

In operation, the laser beam is directed substantially along the longitudinal axis of housing 3. The interaction of the laser beam and the metallic target produces a mobile plasmoid or combustion wave 20 which propagates up the laser beam at a velocity which depends on the laser beam intensity. The laser intensity should be, at this point in time, only slightly over threshold. The plasmoid motion is impeded by the magnetic mirror. An equilibrium position is reached, in which the plasmoid becomes stationary at a position in front of the magnetic mirror, which depends on the strength of the magnetic field from coil 8. Thus, varying of the magnetic field strength for a given laser output power and intensity, will cause the plasma to adjust its position along the axis with respect to changes in the field of force. The laser power and intensity, and the magnetic field may be simultaneously increased in such a way as to maintain the plasma stationary. The increased power input raises the plasma temperature. This procedure is continued until the desired plasma temperature is reached.

Although a particular embodiment and form of this invention has been illustrated, it will be apparent to those skilled in the art that modification may be made without departing from the scope and spirit of the foregoing disclosure. Therefore it should be understood that the invention is limited only by the claims appended hereto.

I claim:

1. Apparatus for generation and confinement of plasma comprising: a continuous wave laser for radiating energy to a focal plane, ignition means at said focal plane for initiating a plasma when irradiated by said laser energy, magnetic means for restricting normal motion of said plasma up the laser beam, and a housing forming an elongated chamber therein having a longitudinal axis along which said laser energy is directed to said ignition means, and said magnetic means is disposed circumferentially around a portion of said axis for uniformly applying a magnetic field around said axis for containing said plasma between said magnetic field and said focal plane.

2. Apparatus as set forth in claim 1 and further comprising gas within said chamber for maintaining the plasma within the laser beam, and means for varying the pressure within said chamber.

3. Apparatus as set forth in claim 2 wherein said magnetic means is a superconducting coil.

4. Apparatus as set forth in claim 3 wherein said gas is air.

5. A method for generating and confinement of a plasma comprising the steps of:
- focusing a continuous wave laser beam in a focal plane;
- irradiating igniting means at said focal plane for initiating a plasma;
- applying a magnetic field across a portion of the path of said laser beam around the circumference thereof for magnetically restricting motion of said plasma up said laser beam; and
- establishing a selectable plasma equilibrium position within said laser beam between said magnetic field and said focal plane by adjusting the magnetic field intensity.

6. A method as set forth in claim 5 and further comprising the steps of varying the temperature of said plasma by simultaneously varying the laser beam intensity and the magnetic field.

* * * * *